US012802980B2

(12) United States Patent
Otani et al.

(10) Patent No.: US 12,802,980 B2
(45) Date of Patent: Nov. 17, 2026

(54) NONAQUEOUS ELECTROLYTE BATTERY AND BATTERY PACK

(71) Applicant: KABUSHIKI KAISHA TOSHIBA, Tokyo (JP)

(72) Inventors: Natsuki Otani, Yokohama (JP); Naoki Nishio, Yokohama (JP); Takuya Hasegawa, Yokohama (JP); Ryo Hara, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 645 days.

(21) Appl. No.: 18/351,773

(22) Filed: Jul. 13, 2023

(65) Prior Publication Data

US 2023/0352682 A1 Nov. 2, 2023

Related U.S. Application Data

(63) Continuation of application No. PCT/JP2021/004113, filed on Feb. 4, 2021.

(51) Int. Cl.
*H01M 4/525* (2010.01)
*G01N 23/2055* (2018.01)
(Continued)

(52) U.S. Cl.
CPC ........ *H01M 4/525* (2013.01); *G01N 23/2055* (2013.01); *H01M 10/0567* (2013.01);
(Continued)

(58) Field of Classification Search
CPC ............. H01M 4/525; H01M 10/0567; H01M 10/0569; H01M 10/052; H01M 2004/021;
(Continued)

(56) References Cited

U.S. PATENT DOCUMENTS

| | | | |
|---|---|---|---|
| 10,581,110 | B2 | 3/2020 | Kwon et al. |
| 11,005,090 | B2 | 5/2021 | Tuduki et al. |

(Continued)

FOREIGN PATENT DOCUMENTS

| | | |
|---|---|---|
| JP | 2008041402 A | 2/2008 |
| JP | 2016066461 A | 4/2016 |

(Continued)

OTHER PUBLICATIONS

International Search Report mailed on Mar. 30, 2021, in corresponding International Application No. PCT/JP2021/004113, 7 pages (partial English translation provided).

(Continued)

*Primary Examiner* — Daniel H Lee
(74) *Attorney, Agent, or Firm* — Maier & Maier, PLLC

(57) ABSTRACT

According to one embodiment, there is provided a nonaqueous electrolyte battery. A positive electrode includes a lithium nickel cobalt manganese composite oxide represented by $Li_xNi_{1-y-z}Co_yMn_zO_2$; $0<x\leq1.2$, $0<y<1$, $0<z<1$, and $0<y+z<1$ as a positive electrode active material. A negative electrode includes a negative electrode active material which reacts at a potential higher than a Li reaction potential by 0.5 V or more. The nonaqueous electrolyte battery satisfies following formulas (1) and (2):

$$3\leq A/B\leq 15 \quad (1)$$

$$1.2\leq a/b\leq 2.4 \quad (2).$$

12 Claims, 5 Drawing Sheets

(51) Int. Cl.

| | |
|---|---|
| ***H01M 10/0567*** | (2010.01) |
| ***H01M 10/0569*** | (2010.01) |
| *H01M 4/02* | (2006.01) |
| *H01M 10/052* | (2010.01) |

(52) U.S. Cl.
CPC .. *H01M 10/0569* (2013.01); *H01M 2004/021* (2013.01); *H01M 2004/028* (2013.01); *H01M 10/052* (2013.01); *H01M 2300/0037* (2013.01)

(58) Field of Classification Search
CPC ... H01M 2004/028; H01M 2300/0037; H01M 4/485; H01M 10/0525; H01M 4/131; H01M 4/505; G01N 23/2055; Y02E 60/10
See application file for complete search history.

(56) References Cited

U.S. PATENT DOCUMENTS

| | | | | |
|---|---|---|---|---|
| 2008/0176142 A1 | 7/2008 | Inagaki et al. | | |
| 2010/0012403 A1 | 1/2010 | Fujita et al. | | |
| 2012/0270093 A1* | 10/2012 | Isozaki | .................. | C01G 53/50 429/163 |
| 2019/0006659 A1* | 1/2019 | Hagiwara | ............. | H01M 4/131 |
| 2021/0143397 A1* | 5/2021 | Uchida | ................. | H01M 4/525 |

FOREIGN PATENT DOCUMENTS

| | | |
|---|---|---|
| JP | 2018098218 | 6/2018 |
| WO | 2006129756 A1 | 12/2006 |
| WO | 2011108106 A1 | 9/2011 |
| WO | 2016175597 A1 | 10/2016 |
| WO | 2018105539 A1 | 6/2018 |

OTHER PUBLICATIONS

Written Opinion issued on Mar. 30, 2021, in corresponding International Application No. PCT/JP2021/004113, 3 pages.

* cited by examiner

NONAQUEOUS ELECTROLYTE BATTERY AND BATTERY PACK

CROSS-REFERENCE TO RELATED APPLICATIONS

This application is a Continuation Application of PCT Application No.PCT/JP2021/004113, filed Feb. 4, 2021, the entire contents of all of which are incorporated herein by reference.

FIELD

Embodiments described herein relate generally to a nonaqueous electrolyte battery and a battery pack.

BACKGROUND

In recent years, nonaqueous electrolyte batteries have been expected to be applied not only to hybrid vehicles and electric vehicles but also to large systems such as electric aircraft and power storage, and improvements in large capacity characteristics, large current output characteristics, long life under high temperature environments, and the like are required. For example, there is lithium nickel cobalt manganese oxide as an active material having excellent large capacity characteristics that can be used as an active material of nonaqueous electrolyte batteries. Batteries or the like which use lithium nickel cobalt manganese oxide for a positive electrode and lithium titanate for a negative electrode have a drawback in that cracking of lithium nickel cobalt manganese oxide particles of the positive electrode, a change to a degraded structure such as a rock salt structure, or the like occurs during cycling, resulting in poor life.

Lithium nickel cobalt manganese oxide is generally polycrystalline, in which secondary particles are formed of an agglomeration of primary particles having a fine particle shape. Using such a positive electrode having a high specific surface area is likely to cause an oxidation reaction between the positive electrode and an electrolytic solution especially in a cycle or calendar test that uses a high potential, making gas generation and an increase in resistance significant.

Using spinel-type lithium titanate ($Li_4Ti_5O_{12}$), for example, that reacts at a potential higher than a Li reaction potential by 0.5 V or more as a negative electrode active material can suppress deposition of lithium dendrite. It is known that the suppression can prevent risks such as short circuit, self-discharge, and ignition, making it possible to produce batteries having excellent life performance. In addition, increasing the specific surface area can increase the output. Increasing the specific surface area, however, increases an amount of moisture adsorbed to the negative electrode. During operation of a battery, the moisture adhered to the negative electrode is electrolyzed by an electrode reaction and hydrogen and oxygen are thereby generated, resulting in an increase in the amount of gas generated. Further, the moisture adhered to the negative electrode may react with a lithium compound included in the nonaqueous electrolyte, thereby generating lithium fluoride (LiF) on the negative electrode. LiF being present on the electrode prevents insertion of lithium into the electrode active material and is thus undesirable. Furthermore, since LiF is a component that exhibits electric resistance, it causes an increase in electric resistance.

DETAILED DESCRIPTION

Figure 1:
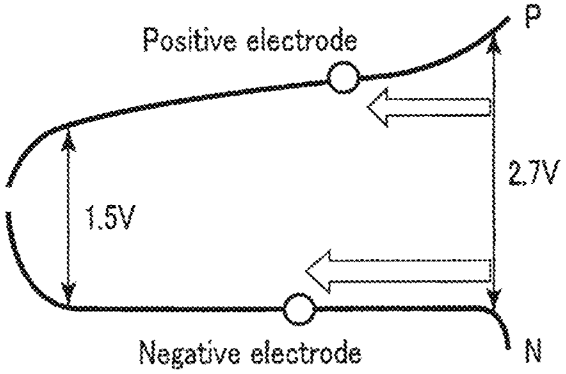
FIG. 1 is a diagram of potential curves showing an example of changes in positive electrode potential and negative electrode potential in the range of a 0% SOC (state of charge) to a 100% SOC.

An object of the invention is to provide a nonaqueous electrolyte battery and a battery pack exhibiting excellent life performance.

According to one embodiment, a nonaqueous electrolyte battery includes a positive electrode, a negative electrode, and a nonaqueous electrolyte. The positive electrode includes a lithium nickel cobalt manganese composite oxide represented by $Li_xNi_{1-y-z}Co_yMn_zO_2$; $0<x\leq1.2$, $0<y<1$, $0<z<1$, and $0<y+z<1$ as a positive electrode active material. The negative electrode includes a negative electrode active material which reacts at a potential higher than a Li reaction potential by 0.5 V or more. The nonaqueous electrolyte battery satisfies following formulas (1) and (2):

$$3\leq A/B\leq15 \quad (1)$$

$$1.2\leq a/b\leq2.4 \quad (2)$$

where A denotes an average primary particle size of the positive electrode active material, B denotes an average primary particle size of the negative electrode active material, a denotes a pore median diameter of the positive electrode in a pore diameter distribution according to a mercury intrusion method, and b denotes a pore median diameter of the negative electrode in a pore diameter distribution according to a mercury intrusion method.

According to another embodiment, a battery pack is provided. The battery pack includes the nonaqueous electrolyte battery according to the embodiments.

Lithium nickel cobalt manganese oxide has a drawback in that particle cracking, a change to a degraded structure such as a rock salt structure, or the like occurs along with cycling, resulting in poor life. As a way to tackle this drawback, suppressing particle cracking by placing a lithium-containing tungsten oxide in the gaps between primary particles has been considered for positive electrode active materials for lithium secondary batteries including a lithium composite metal compound composed of secondary particles formed by agglomeration of primary particles. In addition, an attempt has been made to improve the life and stability by using an intermediate layer including rod-shaped lithium nickel cobalt manganese oxide particles radially oriented toward the surface from the secondary particle-shaped core formed by agglomeration of lithium nickel cobalt manganese oxide primary particles. However, the effect of improving the life with these techniques is not sufficient.

As a result of conducting intensive research, the inventors have found that, in batteries that use lithium nickel cobalt manganese oxide for a positive electrode and lithium titanate for a negative electrode, a decrease in the discharge capacity of the positive electrode during cycling gradually lowers the positive electrode potential during discharging, and occurrence of particle cracking or a change to a degraded structure such as a rock salt structure that is caused by the reduction of a transition metal degrades the battery life. It was also found that the smaller the primary particle size of the active material, the larger the specific surface area, and accordingly the larger the self-discharge amount. Based on this finding, the inventors have discovered that, in nonaqueous electrolyte batteries which include a positive electrode including a lithium nickel cobalt manganese composite oxide represented by $Li_xNi_{1-y-z}Co_yMn_zO_2$; $0<x\leq1.2$, $0<y<1$, $0<z<1$, and $0<y+z<1$ as a positive electrode active material and a negative electrode including a negative electrode active material which reacts at a potential higher than a Li reaction potential by 0.5 V or more, increasing the self-discharge amount of the negative electrode and decreasing the self-discharge amount of the positive electrode by satisfying the following formulas (1) and (2) changes the charge-and-discharge balance of the positive and negative electrodes, and an increase in the positive electrode potential in an SOC of 0% suppresses over-discharge of the positive electrode, resulting in improved life performance:

$$3\leq A/B\leq15 \quad (1)$$

$$1.2\leq a/b\leq2.4 \quad (2)$$

where A denotes an average primary particle size of the positive electrode active material, B denotes an average primary particle size of the negative electrode active material, a denotes a pore median diameter of the positive electrode in a pore diameter distribution according to a mercury intrusion method, and b denotes a pore median diameter of the negative electrode in a pore diameter distribution according to a mercury intrusion method.

Figure 2:
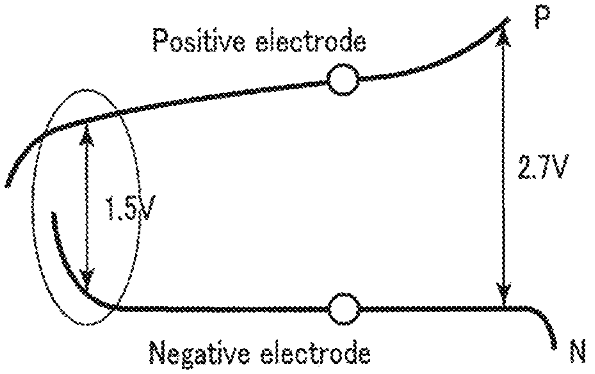
FIG. 2 is a diagram of potential curves showing another example of changes in positive electrode potential and negative electrode potential in the range of a 0% SOC to a 100% SOC.

Description will be given with reference to FIGS. 1 and 2. FIGS. 1 and 2 each show charge-and-discharge curves of the positive electrode and the negative electrode, wherein the battery voltage in an SOC of 0% is 1.5 V and the battery voltage in an SOC of 100% is 2.7 V. The charge-and-discharge curve of the positive electrode is denoted by P, and the charge-and-discharge curve of the negative electrode is denoted by N. In the case of performing aging on the battery in, for example, an SOC of 100%, increasing the self-discharge amount of the negative electrode and decreasing the self-discharge amount of the positive electrode by using the above-described structure makes the SOC of the negative electrode after aging for a certain period of time be smaller than the SOC of the positive electrode, as illustrated in FIG. 1. Performing charge and discharge thereafter causes the charge-and-discharge curve N of the negative electrode to shift to the right side (i.e., the 100% SOC side) so that the difference in SOC between the positive electrode and the negative electrode becomes small, as shown in FIG. 2. As a result, the negative electrode potential in an SOC of 0% increases. Since the battery voltage in an SOC of 0% is constant at 1.5 V, the positive electrode potential increases as the negative electrode potential increases. Accordingly, a decrease in the positive electrode potential which occurs when the positive electrode is over-discharged is suppressed, allowing for suppression of particle cracking and a change to a degraded structure such as a rock salt structure that is caused by the reduction of a transition metal, resulting in improved life performance. Also, since the positive electrode has a large primary particle size, it has a small specific surface area. Accordingly, the oxidation reaction between the positive electrode and the nonaqueous electrolyte can be suppressed even during cycling or calendaring in which a high potential is used, allowing for achievement of improved life performance. Decreasing the primary particle size of the negative electrode and increasing the primary particle size of the positive electrode contributes to improved life. If the ratio A/B of the average primary particle size A of the positive electrode active material to the average primary particle size B of the negative electrode active material in the above formula (1) is less than 3, the difference in self-discharge amount between the positive electrode and the negative electrode is small, making it impossible to achieve sufficient suppression of the over-discharge of the positive electrode enabled by the shift in the charge-and-discharge curve of the negative electrode. If A/B exceeds 15, the self-discharge amount of the negative electrode becomes significantly excessive as compared with the self-discharge amount of the positive electrode, and the charge-and-discharge curve of the negative electrode is shifted significantly to the right. As a result, the positive electrode potential in an SOC of 100% increases more than necessary, resulting in degradation of the life performance. For the aforementioned reasons, A/B is set in the range of the above formula (1). A/B is more preferably in the range of 3 to 12.

In addition, optimizing the ratio between the pore median diameters of the positive and negative electrode as shown in the above formula (2) contributes to the control of the self-discharge amount. Even if the above formula (1) is satisfied, if a/b in the above formula (2) is less than 1.2, the difference in self-discharge amount between the positive electrode and the negative electrode becomes small, making it impossible to sufficiently suppress the over-discharge of the positive electrode. On the other hand, if a/b exceeds 2.4, the self-discharge amount of the negative electrode becomes significantly excessive as compared with the self-discharge amount of the positive electrode, the charge-and-discharge curve of the negative electrode is shifted significantly to the right, and the positive electrode potential in an SOC of 100% is excessively increased, resulting in poor life performance. For the aforementioned reasons, a/b is set in the range of the above formula (2). a/b is more preferably in the range of 1.2 to 2.0.

First Embodiment

Hereinafter, a nonaqueous electrolyte battery of an embodiment will be described in detail. The nonaqueous electrolyte battery includes a positive electrode, a negative electrode, and a nonaqueous electrolyte. The nonaqueous electrolyte battery may further include a separator and a container member. The nonaqueous electrolyte battery according to the embodiment may include an electrode group. The electrode group includes a positive electrode and a negative electrode. The electrode group may further include a separator to be positioned between the positive electrode and the negative electrode. The positive electrode may include a positive electrode current-collecting tab electrically connected to the electrode group. The negative electrode may include a negative electrode current-collecting tab electrically connected to the electrode group. The nonaqueous electrolyte battery according to the embodiment may further include a container member. The electrode group may be housed in the container member. The container member may further contain a nonaqueous electrolyte. The electrode group housed in the container member may be impregnated with the nonaqueous electrolyte. The nonaqueous electrolyte battery according to the embodiment may further include a positive electrode terminal and a negative electrode terminal electrically connected to the container member. The positive electrode terminal may be electrically connected to the positive electrode current-collecting tab of the positive electrode. The negative electrode terminal may be electrically connected to the negative electrode current-collecting tab of the negative electrode.

The positive electrode, the negative electrode, the nonaqueous electrolyte, the separator, and the container member will be described.

(1) Positive Electrode

The positive electrode includes a current collector and a positive electrode active material-containing layer formed on at least one surface of the current collector. If the current collector has, for example, a sheet shape, the active material-containing layer may be supported on at least one main surface of the current collector. The active material-containing layer includes, as a positive electrode active material, a lithium nickel cobalt manganese composite oxide represented by $Li_xNi_{1-y-z}Co_yMn_zO_2$, where $0<x<1.2$, $0<y<1$, $0<z<1$, and $0<y+z<1$. The active material-containing layer may include materials such as a conductive agent and a binder in addition to the active material.

A lithium nickel cobalt manganese composite oxide represented by the above general formula has a large capacity per unit mass, and a large capacity can be obtained by using it up to a positive electrode potential of 4.2 V (vs. $Li/Li^+$) or more. The molar ratio x in the general formula may vary when the positive electrode performs insertion and extraction of lithium ions. A more preferred range is $0.9 \leq x \leq 1.2$.

More preferred ranges of y, z, and y+z in the general formula are $0.05 \leq y \leq 0.22$, $0.07 \leq z \leq 0.30$, and $0.2 \leq y+z \leq 0.5$, respectively.

The lithium nickel cobalt manganese composite oxide represented by $Li_xNi_{1-y-z}Co_yMn_zO_2$ is in the form of particles. The particles of the lithium nickel cobalt manganese composite oxide are preferably monocrystalline particles of the lithium nickel cobalt manganese composite oxide. The average primary particle size A of the lithium nickel cobalt manganese composite oxide can be in the range of 2 μm to 6 μm. Setting the average primary particle size A to 2 μm or more can reduce the influence of the side reaction between the positive electrode and the nonaqueous electrolyte on the life performance. On the other hand, setting the average primary particle size A to 6 μm or less can reduce the influence of the occurrence of the concentration gradient in the particles on the life performance. Therefore, setting the average primary particle size A in the range of 2 μm to 6 μm can further improve the life performance of the battery. A more preferred range of the average primary particle size A is 3.5 μm to 4.5 μm.

The pore median diameter a of the positive electrode is preferably in the range of 0.15 μm to 0.22 μm. Setting the pore median diameter a to 0.15 μm or more can keep the Li-ion diffusion in the positive electrode in a favorable state. Setting the pore median diameter a to 0.22 μm or less can reduce the amount of the nonaqueous electrolyte retained in the positive electrode and suppress a side reaction between the positive electrode and the nonaqueous electrolyte. In addition, since the specific surface area of the positive electrode active material is small, it is possible to reduce the blending amounts of the conductive agent and the binder and increase the void volume in the positive electrode active material-containing layer. Therefore, setting the pore median diameter a in the range of 0.15 μm to 0.22 μm can further improve the life performance and the output performance of the battery. A more preferred range of the pore median diameter a is 0.16 μm to 0.20 μm.

In a powder X-ray diffraction pattern of the positive electrode with Cu K-α radiation, it is preferable that a half width of a diffraction peak in the range of $2\theta=18.7\pm1°$ be 0.06° to 0.14°, and that the following formula (3) be satisfied:

$$1.3 \leq C/D \quad (3)$$

where C denotes an integrated intensity at a peak in the range of $2\theta=18.7\pm1°$ in the powder X-ray diffraction pattern, and D denotes an integrated intensity at a peak in the range of $2\theta=44.4\pm1°$ in the powder X-ray diffraction pattern.

In a powder X-ray diffraction pattern with Cu K-α radiation, a peak appearing at a 2θ of 18.7±1° is a peak derived from the (003) plane of the lithium nickel cobalt manganese composite oxide represented by the above general formula. On the other hand, a peak appearing at a 2θ of 44.4±1° is a peak derived from the (104) plane of the lithium nickel cobalt manganese composite oxide represented by the above general formula. Setting the half width of the peak appearing at a 2θ of 18.7±1° in the range of 0.060 to 0.140 can achieve a large crystallite size of the lithium nickel cobalt manganese composite oxide. Also, setting C/D to 1.3 or more can suppress cation mixing in the lithium nickel cobalt manganese composite oxide and a phenomenon in which other cations are mixed into the sites of lithium ions. In the battery that includes, as a positive electrode active material, the lithium nickel cobalt manganese composite oxide satisfying the above conditions, an insertion-extraction reaction of lithium ions occurs smoothly in the positive electrode; thus, the improvement of the life performance due to the formulas (1) and (2) as defined above is significantly exhibited. The upper limit of C/D can be 5.

The ratio C/D can be adjusted by, for example, the conditions of firing performed in the process of preparing a positive electrode active material. Specifically, it can be controlled by the firing temperature and the firing atmosphere. In general, the synthesis of the positive electrode active material is performed at a high temperature of 700° C. or more, but a long heating time is not preferable because it tends to promote cation mixing. In particular, if the firing temperature exceeds 1000° C., cation mixing occurs and the crystallinity decreases. The firing atmosphere is preferably an oxidizing atmosphere in order to suppress cation mixing.

The conductive agent can enhance current collecting performance and suppress the contact resistance between the active material and the current collector. The conductive agent preferably includes a carbon material. Examples of the carbon material include acetylene black, ketjen black, furnace black, graphite, carbon nanotubes, and carbon nanofibers. The active material-containing layer may contain one, two, or more of these carbon materials.

The conductive agent has, for example, a particle shape or a fiber shape. The average particle size of the conductive agent particles is preferably 20 nm to 100 nm. The proportion of the conductive agent in the active material-containing layer is, for example, preferably 3% by mass to 20% by mass.

Examples of the binder include polytetrafluoro ethylene (PTFE), polyvinylidene fluoride (PVdF), and fluorine rubber. One or more than one type of binder may be used. The proportion of the binder in the active material-containing layer is preferably 1% by mass to 1.8% by mass.

The density of the positive electrode active material-containing layer is preferably 3.2 g/cm$^3$ to 3.8 g/cm$^3$.

For example, a metal foil or an alloy foil may be used as the current collector. Examples of the metal foil include an aluminum foil, a stainless steel foil, and a nickel foil. Examples of the alloy foil include an aluminum alloy, a copper alloy, and a nickel alloy.

The positive electrode is produced, for example, by the following method. An active material, a conductive agent, and a binder are mixed together with a solvent (e.g., N-methylpyrrolidone (NMP)) to prepare a slurry. The obtained slurry is applied to a current collector, dried, and then pressed to obtain a positive electrode. The pore median diameter of the positive electrode active material-containing layer can be adjusted to a target value by, for example, adjusting the primary particle size of the positive electrode active material, the blending amounts of the conductive agent and the binder, and the density. Increasing the primary particle size of the positive electrode active material contributes to increasing the pore median diameter a of the positive electrode. An increase or decrease in the density of the positive electrode active material-containing layer and an increase or decrease in the blending amounts of the conductive agent and the binder each contribute to the adjustment of the pore median diameter a of the positive electrode. If necessary, the step of cutting the active material-containing layer into a predetermined width may be performed before or after the pressing.

(2) Negative Electrode

The negative electrode includes a negative electrode current collector and a negative electrode active material-containing layer formed on the negative electrode current collector. The negative electrode active material-containing layer may contain a conductive agent and a binder in addition to the negative electrode active material.

The negative electrode active material, the conductive agent, the binder, and the negative electrode current collector will be described below.

The negative electrode active material preferably includes an active material that reacts at a potential higher than a Li reaction potential by 0.5 V or more. The nonaqueous electrolyte battery according to the embodiment which includes such a negative electrode can suppress the precipitation of lithium caused by charge and discharge. Thus, such a nonaqueous electrolyte battery excels more in rapid-charge-discharge characteristics. The Li reaction potential is a potential at which lithium ions are inserted and extracted, and is represented by −3.045 V (vs. SHE) with reference to the potential of the standard hydrogen electrode. Examples of the negative electrode active material include: spinel-type lithium titanium oxides represented by $Li_{4+x}Ti_5O_{12}$ (x varies in the range of $-1 \leq x \leq 3$ due to charge-discharge reaction) (reaction potential with respect to the Li reaction potential is 1.55 V); ramsdellite-type lithium titanium oxides represented by $Li_{2+x}Ti_3O_7$ (x varies in the range of $-1 \leq x \leq 3$ due to charge-discharge reaction) (reaction potential with respect to the Li reaction potential is 1.75 V); niobium-titanium composite oxides represented by $Nb_2TiO_7$ (reaction potential with respect to the Li reaction potential is 1.0 to 1.7 V); and metal composite oxides including Ti and at least one selected from the group consisting of P, V, Sn, Cu, Ni, and Fe. Examples of the metal composite oxides including Ti and at least one selected from the group consisting of P, V, Sn, Cu, Ni, and Fe are $TiO_2$—$P_2O_5$, $TiO_2$—$V_2O_5$, $TiO_2$—$P_2O_5$—$SnO_2$, and $TiO_2$—$P_2O_5$-MO (M is at least one selected from the group consisting of Cu, Ni, and Fe). These metal composite oxides are changed into lithium titanium composite oxides when lithium is inserted thereinto by charging. Among the lithium titanium composite oxides, spinel-type lithium titanium oxides is preferred because of its excellent cycle characteristics.

The negative electrode active material that reacts at a potential higher than a Li reaction potential by 0.5 V or more is in the form of particles. The particles may be in the form of primary particles or secondary particles formed by agglomeration of the primary particles. The negative electrode active material may include both single primary particles and secondary particles. The average primary particle size B of the negative electrode active material can be in the range of 0.15 μm to 1 μm. Setting the average primary particle size B to 0.15 μm or more can reduce the influence of gas generation on the life performance. On the other hand, setting the average primary particle size B to 1 μm or less makes the self-discharge amount of the negative electrode appropriate and makes the improvement of the life performance due to the suppression of over-discharge significant. Therefore, setting the average primary particle size B in the range of 0.15 μm to 1 μm can further improve the life performance of the battery. A more preferred range of the average primary particle size B is 0.3 μm to 0.8 μm.

Setting the average primary particle size A of the positive electrode active material in the range of 2 μm to 6 μm and the average primary particle size B of the negative electrode active material in the range of 0.15 μm to 1 μm can suppress both side reaction and over-discharge, thus allowing for further improvement of the life performance of the battery.

The pore median diameter b of the negative electrode is preferably in the range of 0.08 μm to 0.15 μm. Setting the pore median diameter b to 0.08 μm or more can keep the Li-ion diffusion in the negative electrode in a favorable state. Also, setting the pore median diameter b to 0.15 μm or less can reduce the contact resistance between the negative electrode active material particles and between the conductive agent and the negative electrode active material particles. In addition, since the specific surface area of the negative electrode active material is small, it is possible to reduce the blending amounts of the conductive agent and the binder and increase the void volume in the negative electrode active material-containing layer. Therefore, setting the pore median diameter b in the range of 0.08 μm to 0.15 μm can further improve the life performance and the output performance of the battery. A more preferred range of the pore median diameter b is 0.09 μm to 0.14 μm.

Setting the pore median diameter a of the positive electrode in the range of 0.15 μm to 0.22 μm and the pore median diameter b of the negative electrode in the range of 0.08 μm to 0.15 μm can keep the Li-ion diffusion in the positive electrode and the negative electrode in a favorable state while suppressing side reaction and contact resistance, thus allowing for further improvement of the life performance and the output performance of the battery.

In a spectrum according to photoelectron spectrometry (XPS: X-ray photoelectron spectrometry) performed on the surface of the negative electrode, a ratio of a peak intensity attributed to a Li—F bond and appearing in the range of 684 to 680 eV to a F1s peak intensity appearing in the range of 689 to 680 eV is preferably 20% or less. In the XPS spectrum, a peak appearing in the range of 689 to 685 eV is attributed to a C—F bond, and a peak appearing in the range of 684 to 680 eV is attributed to a Li—F bond. The C—F bond is derived from a binder such as polyvinylidene fluoride. Satisfying the above ratio can reduce the LiF content of the negative electrode, thus allowing for suppression of generation of gas derived from the moisture remaining in the negative electrode and enhancement of the life performance. Herein, the surface of the negative electrode refers to a surface (e.g., a main surface) of the negative electrode active material-containing layer. LiF on the surface of the negative electrode may be generated when the moisture adsorbed to the negative electrode, or a pyrolysis product of polyvinylidene fluoride if polyvinylidene fluoride is included as a negative electrode binder, reacts with a lithium compound included in the nonaqueous electrolyte. The moisture adsorbed to the negative electrode and the generation of the pyrolysis product of polyvinylidene fluoride can be controlled by the drying conditions of the negative electrode during manufacture. The drying temperature of the negative electrode may be, for example, 90° C. to 110° C. If the drying temperature is low, the amount of water remaining in the negative electrode increases, and thus the amount of LiF generated tends to increase. Also, if the drying temperature is high, the generation of LiF tends to be promoted.

The density of the negative electrode active material-containing layer can be 2.0 g/cm$^3$ to 2.4 g/cm$^3$.

Examples of the conductive agent include carbonaceous materials such as acetylene black, carbon black, and graphite.

Examples of the binder include polytetrafluoro ethylene (PTFE), polyvinylidene fluoride (PVdF), fluorine rubber, and styrene-butadiene rubber.

If the negative electrode active material is a material capable of inserting lithium ions thereinto and extracting lithium ions therefrom, a material that is electrochemically stable at the lithium-ion insertion-extraction potential of the negative electrode active material can be used as the negative electrode current collector. The negative electrode current collector is preferably a metal foil made of at least one selected from copper, nickel, stainless steel, and aluminum, or an alloy foil made of an aluminum alloy containing at least one element selected from Mg, Ti, Zn, Mn, Fe, Cu, and Si. The negative electrode current collector may have various shapes depending on the use of the battery.

The negative electrode can be produced, for example, by the following method. First, a negative electrode active material, a binder, and, if necessary, a conductive agent are suspended in a general-purpose solvent such as N-methylpyrrolidone (NMP) to prepare a slurry for producing a negative electrode. The obtained slurry is applied onto a negative electrode current collector. The applied slurry is dried and the dried coating is pressed, whereby a negative electrode which includes the negative electrode current collector and a negative electrode active material-containing layer formed on the negative electrode current collector can be obtained. The pore median diameter of the negative electrode active material-containing layer can be adjusted to a target value by, for example, adjusting the primary particle size of the negative electrode active material, the blending amounts of the conductive agent and the binder, and the density. Increasing the primary particle size of the negative electrode active material contributes to increasing the pore median diameter b of the negative electrode. An increase or decrease in the density of the negative electrode active material-containing layer and an increase or decrease in the blending amounts of the conductive agent and the binder each contribute to the adjustment of the pore median diameter b of the negative electrode. If necessary, the step of cutting the active material-containing layer into a predetermined width may be performed before or after the pressing.

(3) Separator

The separator is not particularly limited as long as it has insulating properties. A porous film or nonwoven fabric made of a polymer such as polyolefin, cellulose, polyethylene terephthalate, or vinylon can be used as the separator. One or more than one kind of material in combination may be used as the material of the separator.

The separator may have a thickness of 5 μm to 20 μm.

(4) Electrode Group

The electrode group may have a wound structure in which a stack of a positive electrode, a separator, and a negative electrode is wound, a stacked structure in which a positive electrode and a negative electrode are alternately stacked with a separator interposed therebetween, or other structures.

(5) Nonaqueous Electrolyte

The nonaqueous electrolyte may include a nonaqueous solvent and an electrolyte salt dissolved in the nonaqueous solvent. Examples of the nonaqueous electrolyte include nonaqueous electrolytic solutions and gelled nonaqueous electrolytes.

Examples of the electrolyte salt include lithium salts such as $LiPF_6$, $LiBF_4$, $Li(CF_3SO_2)_2N$ (lithium bis(trifluoro methanesulfonyl)imide; commonly known as LiTFSI), $LiCF_3SO_3$ (commonly known as LiTFS), $Li(C_2F_5SO_2)_2N$ (lithium bis(pentafluoro ethanesulfonyl)imide; commonly known as LiBETI), $LiClO_4$, $LiAsF_6$, $LiSbF_6$, lithium bis (oxalate)borate {$LiB(C_2O_4)_2$, commonly known as LiBOB}, and lithium difluoro(trifluoro-2-oxide-2-trifluoro-methylpropionate(2−)-0,0)borate {$LiBF_2OCOOC(CF_3)_2$, commonly known as $LiBF_2$(HHIB)}. These electrolyte salts may be used alone or in the form of a mixture of two or more thereof. $LiPF_6$, $LiBF_4$, or a mixture thereof is preferably used as the electrolyte salt.

The concentration of the electrolyte salt in the nonaqueous electrolyte is preferably in the range of 1 mol/L to 3 mol/L. If the concentration of the electrolyte salt is within this range, it is possible to further improve the performance when a high load current is passed, while suppressing the influence of an increase in viscosity due to an increase in the concentration of the electrolyte salt in the nonaqueous electrolyte.

The nonaqueous solvent is not particularly limited. For example, a cyclic carbonate such as propylene carbonate (PC) or ethylene carbonate (EC), a chain carbonate such as diethyl carbonate (DEC), dimethyl carbonate (DMC), methyl ethyl carbonate (MEC), or dipropyl carbonate (DPC), difluorophosphate, 1,2-dimethoxyethane (DME), γ-butyrolactone (GBL), tetrahydrofuran (THF), 2-methyltetrahydrofuran (2-MeHF), 1,3-dioxolane, sulfolane, or acetonitrile (AN) is used as the nonaqueous solvent. These solvents may be used alone or in the form of a mixture of two or more thereof. The nonaqueous solvent preferably includes diethyl carbonate and difluorophosphate. Especially during charge-and-discharge cycling and calendaring (storage, preservation) which use a high potential, an oxidation reaction between the positive electrode and the nonaqueous electrolyte is likely to occur, and gas generation and an increase in resistance are significant. Diethyl carbonate can suppress gas generation caused by an oxidation reaction of the nonaqueous electrolyte on the positive electrode. On the other hand, difluorophosphate can suppress a decomposition reaction of a Li salt in the nonaqueous electrolyte. Since a battery including a nonaqueous electrolyte including diethyl carbonate and difluorophosphate can suppress an oxidation reaction between the positive electrode and the nonaqueous electrolyte and a decomposition reaction of a support salt, the life performance can be further improved. Examples of difluorophosphate include lithium difluorophosphate ($LiPO_2F_2$), sodium difluorophosphate, and potassium difluorophosphate.

(6) Container Member

For example, a laminated film or a metallic container is used as the container member. Each of the thickness of the laminated film and the thickness of the metallic container may be 0.5 mm or less. A resin container made of polyolefin resin, polyvinyl chloride resin, polystyrene resin, acrylic resin, phenol resin, polyphenylene resin, fluorine resin, or the like may also be used as the container member.

Examples of the shape of the container member, that is, the shape of the battery, include a flat shape (thin shape), a rectangular shape, a cylindrical shape, a coin shape, and a button shape. For example, the battery can be applied to both a small-sized battery mounted on a portable electronic device or the like, and a large-sized battery mounted on a two-wheel or four-wheel vehicle or the like.

For example, a multilayer film including resin layers and a metal layer interposed between the resin layers is used as the laminated film. The metal layer is preferably an aluminum foil or an aluminum alloy foil for weight reduction. For example, a polymeric material such as polypropylene (PP), polyethylene (PE), nylon, or polyethylene terephthalate (PET) can be used as the resin layer. The laminated film can be formed into the shape of the container member by heat-sealing.

The metallic container is made of aluminum, an aluminum alloy, or the like. The aluminum alloy preferably contains an element such as magnesium, zinc, or silicon. If the alloy contains transition metals such as iron, copper, nickel, and chromium, the content thereof is preferably 100 ppm or less.

Figure 3:
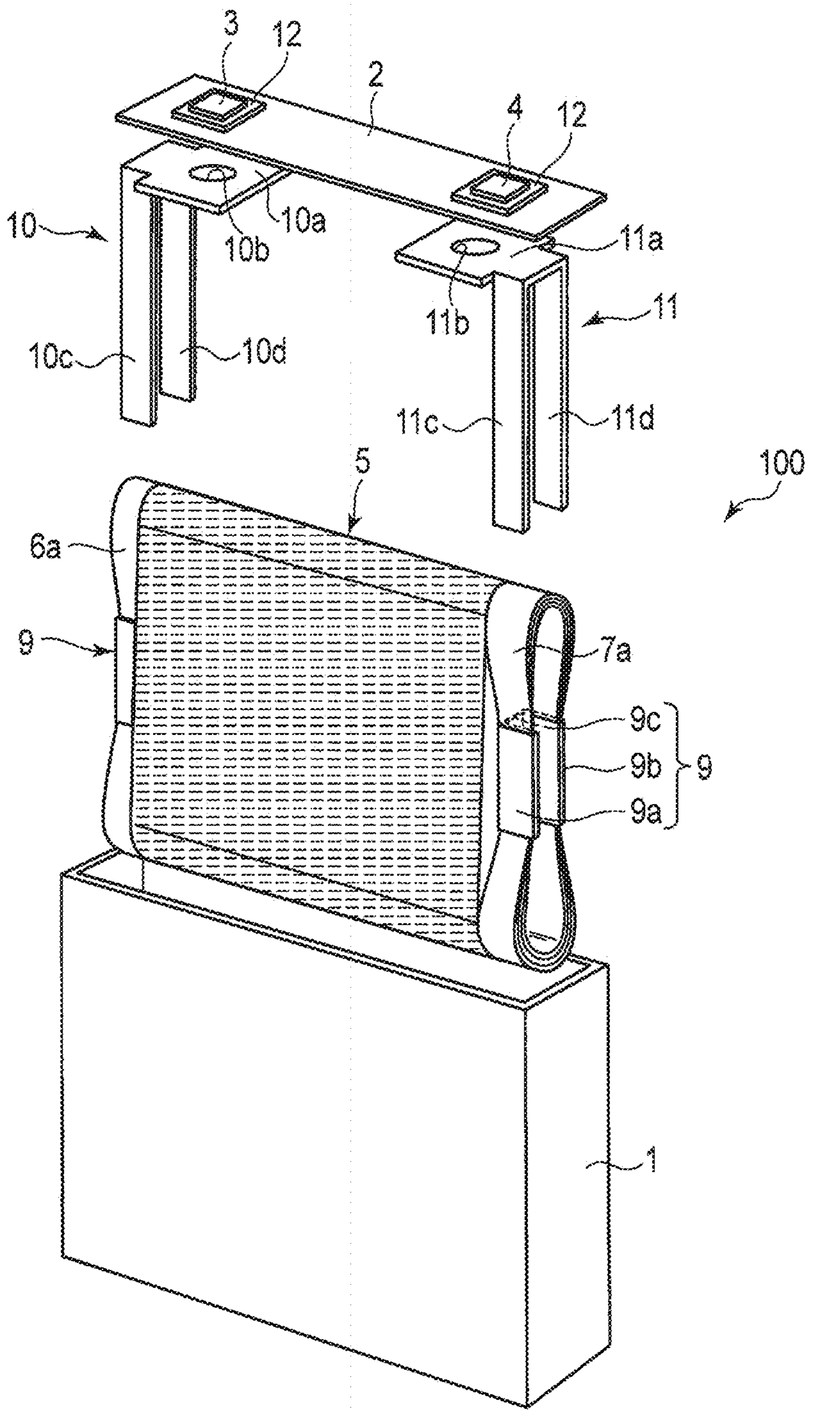
FIG. 3 is an exploded perspective view of an example of a nonaqueous electrolyte battery according to an embodiment.

Next, an example of the nonaqueous electrolyte battery according to the embodiment will be described in more detail with reference to the drawings. FIG. 3 is an exploded perspective view of an example of a nonaqueous electrolyte battery of the embodiment. The battery shown in FIG. 3 is a sealed rectangular nonaqueous electrolyte battery. The nonaqueous electrolyte battery shown in FIG. 3 includes a container can 1, a lid 2, a positive electrode external terminal 3, a negative electrode external terminal 4, and an electrode group 5. The container can 1 and the lid 2 constitute a container member. The container can 1 has a bottomed rectangular tube shape and is made of a metal such as aluminum, an aluminum alloy, iron, or stainless steel.

Figure 4:
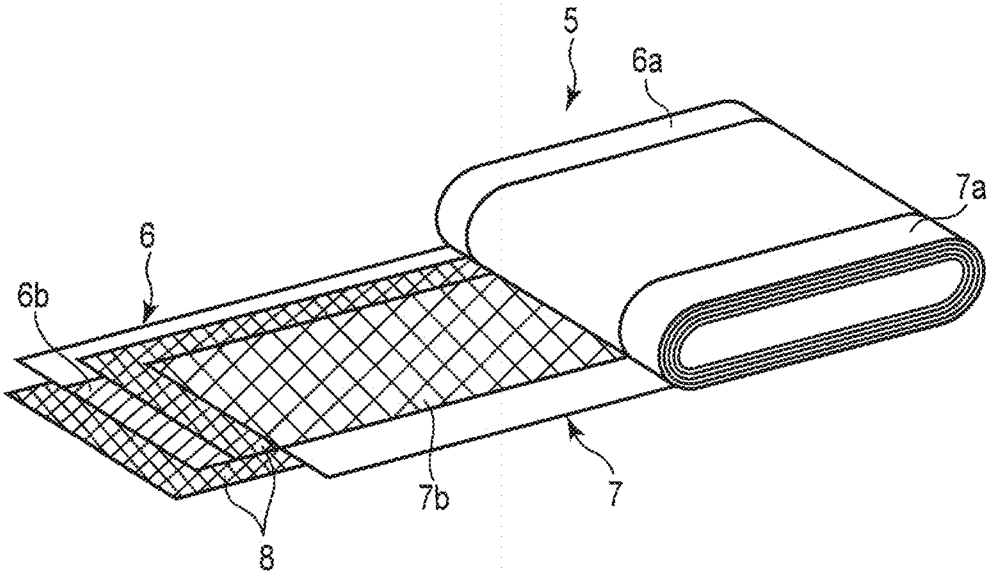
FIG. 4 is a partially unfolded perspective view of an electrode group used in the nonaqueous electrolyte battery shown in FIG. 3.

FIG. 4 is a partially unfolded perspective view of an electrode group used in the nonaqueous electrolyte battery shown in FIG. 3. As shown in FIG. 4, the flat electrode group 5 is formed by winding the positive electrode 6 and the negative electrode 7 in a flat shape with the separator 8 interposed therebetween. The positive electrode 6 includes a strip-shaped positive electrode current collector made of, for example, a metal foil, a positive electrode current-collecting tab 6*a* with one end parallel to a long side of the positive electrode current collector, and a positive electrode material layer (positive electrode active material-containing layer) 6*b* formed on the positive electrode current collector excluding at least the portion where the positive electrode current-collecting tab 6*a* is located. On the other hand, the negative electrode 7 includes a strip-shaped negative electrode current collector made of, for example, a metal foil, a negative electrode current-collecting tab 7*a* with one end parallel to a long side of the negative electrode current collector, and a negative electrode material layer (negative electrode active material-containing layer) 7*b* formed on the negative electrode current collector excluding at least the portion where the negative electrode current-collecting tab 7*a* is located.

The positive electrode 6, the separator 8, and the negative electrode 7 configured as described above are wound with the positions of the positive electrode 6 and the negative electrode 7 shifted with respect to each other, so that the positive electrode current-collecting tab 6*a* protrudes from the separator 8 in the winding axis direction of the electrode group and the negative electrode current-collecting tab 7*a* protrudes from the separator 8 in the opposite direction. With such a winding manner, the electrode group 5 is configured so that the spirally wound positive electrode current-collecting tab 6*a* protrudes from one end face, and the spirally wound negative electrode current-collecting tab 7*a* protrudes from the other end face, as shown in FIG. 4. The electrode group 5 is impregnated with a nonaqueous electrolyte (not shown).

As shown in FIG. 3, each of the positive electrode current-collecting tab 6*a* and the negative electrode current-collecting tab 7*a* is divided into two bundles with the vicinity of the winding center of the electrode group set as a boundary. A conductive holding member 9 has substantially U-shaped first and second holding parts 9*a* and 9*b* and a connecting part 9*c* for electrically connecting the first holding part 9*a* and the second holding part 9*b*. In each of the positive and negative electrode current-collecting tabs 6*a* and 7*a*, one of the bundles is held by the first holding part 9*a*, and the other of the bundles is held by the second holding part 9*b*.

The positive electrode lead 10 includes a substantially rectangular support plate 10*a*, a through-hole 10*b* opened in the support plate 10*a*, and strip-shaped current-collecting parts 10*c* and 10*d* branched from the support plate 10*a* and extending downward. On the other hand, the negative electrode lead 11 includes a substantially rectangular support plate 11*a*, a through-hole 11*b* opened in the support plate 11*a*, and strip-shaped current-collecting parts 11*c* and 11*d* branched from the support plate 11*a* and extending downward.

The positive electrode lead 10 holds the holding member 9 between the current-collecting parts 10*c* and 10*d*. The current-collecting part 10*c* is disposed on the first holding part 9*a* of the holding member 9. The current-collecting part 10*d* is disposed on the second holding part 9*b*. The current-collecting parts 10*c* and 10*d*, the first and second holding parts 9*a* and 9*b*, and the positive electrode current-collecting tab 6*a* are joined by, for example, ultrasonic welding. Thus, the positive electrode 6 of the electrode group 5 and the positive electrode lead 10 are electrically connected to each other via the positive electrode current-collecting tab 6*a*.

The negative electrode lead 11 holds the holding member 9 between the current-collecting parts 11*c* and 11*d*. The current-collecting part 11*c* is disposed on the first holding part 9*a* of the holding member 9. On the other hand, the current-collecting part 11*d* is disposed on the second holding part 9*b*. The current-collecting parts 11*c* and 11*d*, the first and second holding parts 9*a* and 9*b*, and the negative electrode current-collecting tab 7*a* are joined by, for example, ultrasonic welding. Thus, the negative electrode 7 of the electrode group 5 and the negative electrode lead 11 are electrically connected to each other via the negative electrode current-collecting tab 7*a*.

The materials of the positive and negative electrode leads 10 and 11 and the holding member 9 are not particularly specified, but are preferably the same as the materials of the positive and negative electrode external terminals 3 and 4. For example, aluminum or an aluminum alloy is used for the positive electrode external terminal 3, and aluminum, an aluminum alloy, copper, nickel, nickel-plated iron, or the like is used for the negative electrode external terminal 4. For example, if the materials of the external terminals are aluminum or an aluminum alloy, the materials of the leads are preferably aluminum or an aluminum alloy. If the external terminals are made of copper, the materials of the leads are preferably copper or the like.

The rectangular plate-shaped lid 2 is seam-welded to the opening of the outer can 1 by, for example, a laser. The lid 2 is formed of, for example, a metal such as aluminum, an aluminum alloy, iron, or stainless steel. The lid 2 and the outer can 1 are preferably formed of the same kind of metal. The positive electrode external terminal 3 is electrically connected to the support plate 10*a* of the positive electrode lead 10, and the negative electrode external terminal 4 is electrically connected to the support plate 11*a* of the negative electrode lead 11. The insulating gasket 12 is disposed between the lid 2 and the positive and negative electrode external terminals 3 and 4, and electrically insulates the positive and negative electrode external terminals 3 and 4 from the lid 2. The insulating gasket 12 is preferably a resin molded product.

Hereinafter, the composition of the active material, the average primary particle size, the pore median diameter, the identification of the components in the nonaqueous electrolyte, the photoelectron spectroscopy, and the method of measuring the density of the active material-containing layer will be described. First, a method of removing an electrode from a battery will be described.

First, a battery to be measured is prepared. The battery to be measured has a discharge capacity of 80% or more of the rated capacity. That is, a battery which has deteriorated excessively is not used for measurement.

Next, the prepared battery is discharged until the open-circuit voltage reaches 2.0 to 2.2 V. The discharged battery is then transferred into an argon-filled glove box with an internal atmosphere having a dew point of −70° C. The battery is opened in such a glove box. An electrode group is removed from the opened battery. If the electrode group removed includes a positive electrode lead and a negative electrode lead, the positive electrode lead and the negative electrode lead are cut with attention paid so as not to short-circuit the positive electrode and the negative electrode.

Next, the electrode group is disassembled into a positive electrode, a negative electrode, and a separator. The electrode (e.g., a positive electrode) thus obtained is washed using ethyl methyl carbonate as a solvent. In this washing step, a component obtained by the disassembly is completely immersed in the ethyl methyl carbonate solvent and let stand in this state for 60 minutes.

After the washing, the electrode is subjected to vacuum drying. When performing the vacuum drying, the pressure is reduced from the atmospheric pressure to −97 kpa or more in a 25° C. environment, and this state is maintained for 10 minutes. The electrode removed in this manner is measured by the following method.

[Composition of Active Material]

The composition of the active material can be known by measuring, with fluorescent X-rays (XRF), the surface of each of the positive electrode and the negative electrode removed from the battery by the above-described procedure.

[Measurement of Average Primary Particle Size of Positive Electrode and Negative Electrode Active Materials with Cross-Sectional SEM]

The primary particle refers to a unit particle that does not include a crystal grain boundary inside the particle. The average particle size of the primary particles can be determined by, for example, observing a cross section of the electrode with a scanning electron microscope (SEM). As the particle sizes of 30 randomly selected primary particles, equivalent circle diameters are calculated according to an image analysis using, for example, an image analysis software "Particle Analysis" Ver. 3.5 manufactured by NIPPON STEEL THECHNOLOGY Co., Ltd., and the average value of the obtained equivalent circle diameters is defined as the average primary particle size. The particle size is typically a diameter of a sphere having the same volume or the same cross-sectional area as that of the particle.

[Measurement of Positive Electrode and Negative Electrode Pore Median Diameters according to Mercury Intrusion Method]

For each of the positive electrode and the negative electrode removed from the battery by the above procedure, a pore diameter distribution measurement is performed by a mercury intrusion method to calculate a pore median diameter.

A plurality of strip-shaped measurement samples are cut out from the electrode. The size of each of the measurement samples is, for example, 1.25 cm×2.50 cm. The mass of each of the cut measurement samples is then measured. Next, 16 measurement samples are loaded into the cell of the measurement apparatus. These measurement samples are measured under the conditions of an initial pressure of about 10 kPa (about 1.5 psia, equivalent to a pore diameter of about 120 μm) and a maximum pressure of 414 MPa (about 59986 psia, equivalent to a pore diameter of about 0.003 μm) to obtain a pore diameter distribution curve of the electrode. For example, a micromeritics pore diameter distribution analyzer AutoPore 9520 manufactured by SHIMADZU is used as the measuring apparatus.

Subsequently, the active material-containing layer is peeled off, by using, for example, a spatula, from another measurement sample cut out from the same electrode, and a current collector piece is obtained. Next, the mass of the current collector piece is measured. Then, the mass of the active material-containing layer included in the measurement sample is obtained by subtracting the mass of the current collector piece from the mass of the measurement sample. Thereafter, the pore diameter distribution curve of the electrode obtained by the above method is recalculated and converted into a pore diameter distribution curve of the active material-containing layer. In this manner, the pore diameter distribution curve of the active material-containing layer is obtained. The pore median diameter can be determined from the pore diameter distribution obtained as described above. The pore median diameter refers to a pore diameter at a cumulative number of particles of 50% in a pore diameter distribution showing the number of particles for each pore diameter.

[Powder X-Ray Diffraction Measurement of Positive Electrode]

RINT Ultima+ manufactured by Rigaku Corporation is used as a measuring apparatus, and Cu K-α radiation is used as an X-ray source. Detailed conditions are as follows:

Output: 40 kV, 40 mA, Divergence slit: 1°, Divergence longitudinal limiting slit: 10 mm, Scattering slit: 1°, Receiving slit: 0.15 mm, Scanning axis: 2θ/θ, Measurement method: continuous measurement range (2θ): 10 to 90° and 70 to 140°, Sampling interval: 0.004°, Scanning speed: 0.400°/min The positive electrode removed by the method described above is cut out into approximately the same size as the area of a holder of a powder X-ray diffractometer and directly attached to an aluminum holder to carry out measurement.

In the powder X-ray diffraction pattern obtained under the above conditions, the half width of the diffraction peak in the range of 2θ=18.7±1°, the integrated intensity of the peak in the range of 2θ=18.7±1°, and the integrated intensity of the peak in the range of 2θ=44.4±1° are determined.

[Measurement of Diethyl Carbonate Included in Nonaqueous Electrolyte]

By performing gas chromatography analysis of the nonaqueous electrolyte obtained from the electrode group removed by the above procedure, it is possible to ascertain that diethyl carbonate is included in the solvent of the nonaqueous electrolyte.

[Measurement of Difluorophosphate Included in Nonaqueous Electrolyte]

The amount of difluorophosphate included in the nonaqueous electrolyte battery can be determined by using the nonaqueous electrolyte obtained from the electrode group removed by the above procedure and detecting the difluorophosphate included in the measurement sample through electrophoresis. An example of electrophoresis conditions is as follows: capillary: internal diameter 50 μm, length 72 cm, applied voltage: −30 kV, temperature: 15° C., migration solution: buffer for inorganic anion analysis manufactured by Agilent Technologies, detection wavelength: Signal=350 (±80) nm, ref=245 (±10) nm (indirect absorbance method), measurement time: 15 min. The buffer for inorganic anion analysis manufactured by Agilent Technologies is composed of water, sodium hydroxide, 1,2,4,5-benzenetetracarboxylic acid, triethanolamine, and hexamethonium bromide.

[Photoelectron Spectroscopy Measurement of Negative Electrode Surface]

A measurement sample of the active material-containing layer including a surface portion not in contact with the current collector is obtained from the negative electrode removed by the above-described method. The measurement sample is then loaded into an X-ray photoelectron spectrometer. For example, a VG Theta Probe manufactured by Thermo Fisher Scientific is used as the X-ray photoelectron spectrometer.

In the measurement, a single-crystal spectroscopic Al K-α ray is used as an excitation X-ray source. The single-crystal spectroscopic Al K-α ray is a light obtained by dispersing an Al K-α ray with a single crystal to improve the chromaticity. An X-ray photoelectron spectroscopy (XPS) spectrum is obtained by applying this excitation X-ray source to a surface portion of the measurement sample that is not in contact with the current collector so that the X-ray spot has an elliptical shape of 800×400 μm. In the XPS spectrum, the horizontal axis represents the binding energy of photoelectrons, and the vertical axis represents the number of photoelectrons observed per unit time.

In the XPS analysis, an area up to a depth of, for example, 0 to 10 nm from a surface of a sample can be analyzed. Therefore, according to the XPS analysis, it is possible to obtain information of an area from the surface of the active material-containing layer to a depth of 0 to 10 nm. In other words, an X-ray photoelectron spectroscopy spectrum of the measurement sample can be said to be a spectrum relating to the surface of the active material-containing layer.

Next, a method of calculating the F1s peak intensity appearing in the range of 689 to 680 eV and the peak intensity attributed to a Li—F bond and appearing in the range of 684 to 680 eV will be described.

The area of each peak on the XPS spectrum is calculated. Specifically, first, the peak of each element on the XPS spectrum is separated into a plurality of peaks using a Gaussian function. Then, a fitting analysis is performed on the separated peaks. The separated peaks that have been subjected to the fitting analysis are then superimposed onto each other to further perform a fitting analysis. Thereafter, using the Shirley method, a background is determined and subtracted from the XPS spectrum obtained after the further fitting analysis. The area of the peak of each element is calculated from the XPS spectrum thus obtained. The ratio of the peak area attributed to the Li—F bond and appearing in the range of 684 to 680 eV to the F1s peak area appearing in the range of 689 to 680 eV is defined as the peak intensity ratio to be determined.

[Method of Measuring Density of Active Material-Containing Layer]

The density of the active material-containing layer of each of the positive electrode and the negative electrode can be measured by the following procedure. First, the thicknesses of the electrodes removed by the above-described method are measured using a thickness measuring instrument. Next, using a cutting machine, the electrodes are punched out to a size of 1 cm×1 cm to obtain electrode samples. Then, the mass of the electrode samples is measured.

Next, the active material-containing layers are peeled off from the electrode samples to obtain current collector samples. Specifically, the active material-containing layers can be removed from the electrode samples by, for example, immersing the electrode samples in a solvent such as N-methylpyrrolidone. Any solvent may be used as the solvent to be used for peeling off the active material-containing layers, provided that it does not corrode the current collectors and can peel off the active material-containing layers. Then, the thicknesses and the mass of the current collector samples are measured.

Next, the thicknesses of the active material-containing layers are calculated by subtracting the thicknesses of the current collector samples from the thicknesses of the electrode samples. The volume of the active material-containing layers is calculated from these thicknesses. The mass of the active material-containing layers is also calculated by subtracting the mass of the current collector samples from the mass of the electrode samples. Then, the density (unit: $g/cm^3$) of the active material-containing layers can be calculated by dividing the mass of the active material-containing layers by the volume of the active material-containing layers.

The battery according to the first embodiment described above includes a positive electrode including a lithium nickel cobalt manganese composite oxide represented by $Li_xNi_{1-y-z}Co_yMn_zO_2$; 0<x 1.2, 0<y<1, 0<z<1, and 0<y+z<1 as a positive electrode active material and a negative electrode including a negative electrode active material which reacts at a potential higher than a Li reaction potential by 0.5 V or more. When the battery satisfies the formula (1), 3≤A/B≤15, and the formula (2), 1.5≤a/b≤2.4, the over-discharge of the positive electrode is suppressed, allowing for improvement of the life performance.

Second Embodiment

According to a second embodiment, a battery pack including a battery is provided. The battery according to the first embodiment is used as the battery. One or more single batteries may be included in the battery pack.

A plurality of batteries may be electrically connected in series, in parallel, or in a combination of in-series connection and in-parallel connection, to constitute a battery module. The battery pack may include a plurality of battery modules.

The battery pack may further include a protective circuit. The protective circuit functions to control charge and discharge of the battery. Alternatively, a circuit included in devices (such as electronic devices and automobiles) which use a battery pack as a power source may be used as the protective circuit of the battery pack.

The battery pack may further include an external power distribution terminal. The external power distribution terminal is configured to output current from the battery to the outside and to input current into the battery. In other words, when using the battery pack as a power source, current is supplied to the outside through the external power distribution terminal. When charging the battery pack, charge current (including regenerative energy of a motive force of an automobile) is supplied to the battery pack through the external power distribution terminal.

Figure 5:
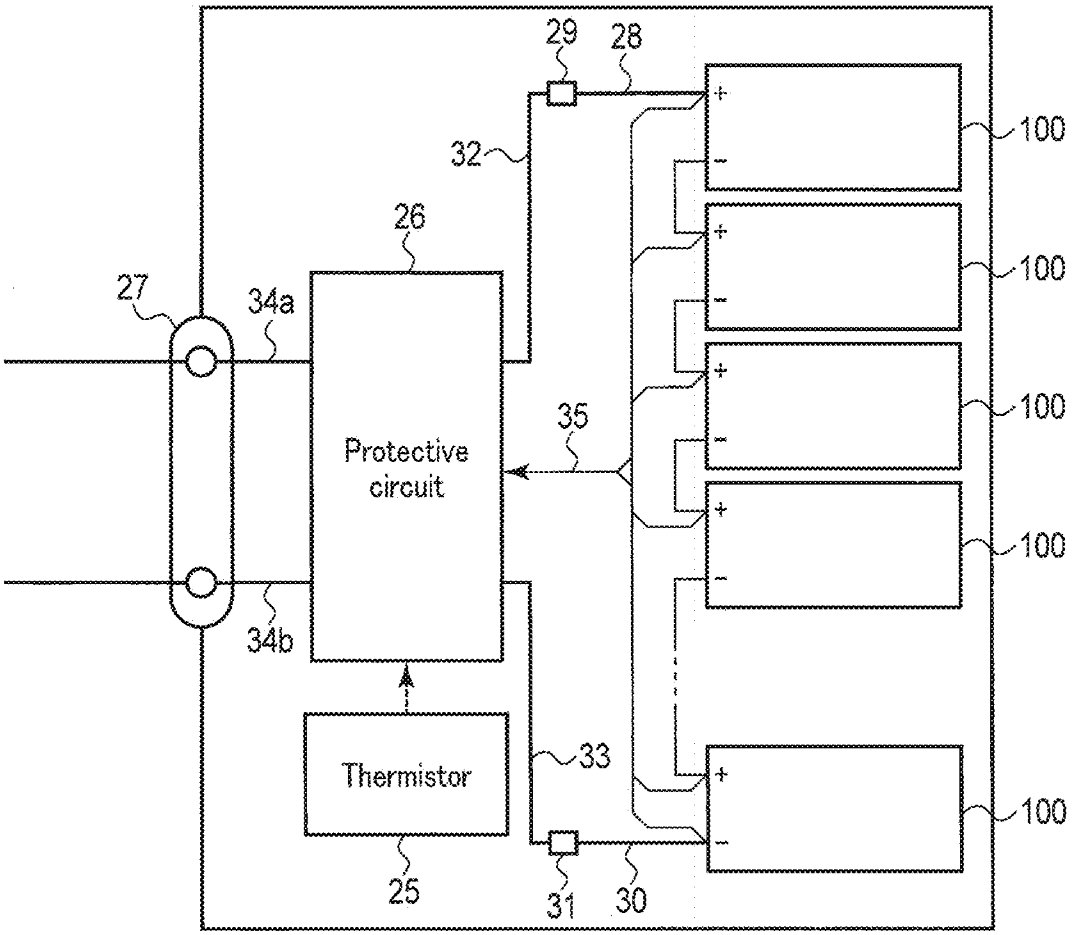
FIG. 5 is a block diagram showing an example of an electric circuit of a battery pack according to an embodiment.

Next, an example of the battery pack according to the second embodiment will be described with reference to the drawings. FIG. 5 is a block diagram showing an example of an electric circuit of the battery pack according to the embodiment.

The battery pack shown in FIG. 5 includes a plurality of flat batteries 100 having the structure shown in FIGS. 3 and 4. These single batteries 100 are electrically connected to each other in series as shown in FIG. 5.

As shown in FIG. 5, a thermistor 25, a protective circuit 26, and a power distribution terminal 27 to an external device are mounted on the printed wiring board.

A positive electrode-side lead 28 is connected to a positive electrode external terminal of a single battery 100 of the battery module, and the positive electrode-side lead 28 is electrically connected to a positive electrode-side connector 29 of the printed wiring board. A negative electrode-side lead 30 is connected to a negative electrode external terminal of another single battery 100 of the battery module, and the negative electrode-side lead 30 is electrically connected to a negative electrode-side connector 31 of the printed wiring board. These connectors 29 and 31 are electrically connected to the protective circuit 26 through wires 32 and 33 formed on the printed wiring board.

The thermistor 25 detects the temperature of each of the single batteries 100, and the detection signals are transmitted to the protective circuit 26. The protective circuit 26 can shut off a plus-side wire 34*a* and a minus-side wire 34*b* between the protective circuit 26 and the power distribution terminal 27 to an external device under a predetermined condition. An example of the predetermined condition is the case where a signal indicating that the temperature of the single battery 100 is equal to or higher than a predetermined temperature is received from the thermistor 25. Another example of the predetermined condition is the case where overcharge, over-discharge, overcurrent, or the like of the single battery 100 is detected. The detection of the overcharge or the like is performed for the individual single batteries 100 or the single batteries 100 as a whole. In the case of detecting the individual single batteries 100, a battery voltage may be detected, or a positive electrode potential or a negative electrode potential may be detected. In the latter case, a lithium electrode used as a reference electrode is inserted into each single battery 100. In the battery pack shown in FIG. 5, a wire 35 for voltage detection is connected to each of the single batteries 100, and a detection signal is transmitted to the protective circuit 26 through the wire 35.

Although the battery pack shown in FIG. 5 has a configuration in which the single batteries 100 are connected in series, the battery pack according to the second embodiment may be configured so that the single batteries 100 are connected in parallel to increase the battery capacity. Alternatively, the battery pack according to the second embodiment may include a plurality of single batteries 100 connected in a combination of in-series connection and in-parallel connection. Assembled battery packs may also be connected in series or in parallel.

Although the battery pack shown in FIG. 5 includes a plurality of single batteries 100, the battery pack according to the second embodiment may include one single battery 100.

The form of the battery pack is appropriately changed depending on the applications. The battery pack is preferably used in applications where cycle characteristics with large current characteristics are desired.

Specifically, the battery pack is used as a power source of digital cameras or a battery of vehicles such as two- or four-wheeled hybrid electric automobiles, two- or four-wheeled electric automobiles, and electric bicycles. The battery pack is particularly suitable for use in the on-vehicle applications.

In an automobile including the battery pack according to the embodiment, the battery pack, for example, recovers regenerative energy of the motive force of the automobile.

The battery pack of the second embodiment detailed above includes the battery of the first embodiment. Therefore, the battery pack according to the second embodiment can suppress over-discharge of the positive electrode and improve the life performance.

EXAMPLES

Hereinafter, examples will be shown to describe the invention in more detail; however, the invention is not limited to the examples shown below as long as the invention does not deviate from the scope and spirit of the invention.

Example 1

(Preparation of Positive Electrode)

A lithium-containing nickel cobalt manganese composite oxide $LiNi_{0.5}Co_{0.2}Mn_{0.3}O_2$ (hereinafter referred to as "NCM523") formed of single particles was provided as an active material. Acetylene black as a conductive agent and polyvinylidene fluoride as a binder were provided. The active material, the conductive agent, and the binder were dissolved and mixed in N-methylpyrrolidone (M4P) at a weight ratio of 93:5:2 to prepare a paste. The paste-form dispersion liquid as a positive electrode coating liquid was uniformly applied to both front and back surfaces of a current collector made of a strip-shaped aluminum foil. The coating of the positive electrode coating liquid was dried to form a positive electrode active material-containing layer. Press molding was performed on the dried strip-shaped body so that the density of the positive electrode active material-containing layer would be 3.4 g/cm$^3$. The rolled electrode was cut into a predetermined size. A current-collecting tab was welded thereto to obtain a positive electrode.

(Preparation of Negative Electrode)

A spinel-type lithium titanium oxide represented by $Li_4Ti_5O_{12}$ (hereinafter referred to as "LTO") as a negative electrode active material, graphite as a conductive agent, and polyvinylidene fluoride as a binder were provided. The reaction potential of the spinel-type lithium titanium oxide with respect to a Li reaction potential is 1.55 V. The negative electrode active material, the conductive agent, and the binder were dissolved and mixed in NMP at a weight ratio of 94:4:2 to prepare a paste. This paste as a negative electrode coating liquid was uniformly applied to both front and back surfaces of a negative electrode current collector made of a strip-shaped aluminum foil. The negative electrode coating liquid was dried to form a negative electrode active material-containing layer. Press molding was performed on the dried strip-shaped body so that the density of the negative electrode active material-containing layer would be 2.2 g/cm$^3$. The strip-shaped body was cut into a predetermined size. A current-collecting tab was welded thereto to obtain a negative electrode.

(Preparation of Electrode Group)

Two non-woven fabric separators made of cellulose were prepared. The thickness of each separator was 10 μm. Then, one of the separators, the positive electrode, the other of the separators, and the negative electrode were stacked in this order, and a wound body was formed. This was continuously performed, so that the resultant wound body had the separator positioned at the outermost periphery. Subsequently, a coil of the wound body obtained was pressed while being heated. A wound electrode group was thus prepared.

(Preparation of Nonaqueous Electrolyte)

Propylene carbonate (PC) and diethyl carbonate (DEC) were mixed at a volume ratio of 1:2 to prepare a mixed solvent. Lithium hexafluorophosphate ($LiPF_6$) was dissolved in the mixed solvent at a concentration of 1 mol/L. Lithium difluorophosphate ($LiPO_2F_2$) in an amount of 5000 ppm was added to the obtained solvent to prepare a nonaqueous electrolyte.

(Assembly of Battery)

Electrode terminals were attached to the positive electrode and the negative electrode of the wound electrode group obtained as described above. The electrode group was placed in a rectangular container made of aluminum. The nonaqueous electrolyte described above was injected into the container, the container was sealed, and aging was performed, whereby a nonaqueous electrolyte battery was obtained. The nonaqueous electrolyte battery was designed such that the nominal capacity was 26 Ah.

The average primary particle size A of the positive electrode active material, the pore median diameter a of the positive electrode active material-containing layer, the average primary particle size B of the negative electrode active material, the pore median diameter b of the negative electrode active material-containing layer, A/B, a/b, the half width of the diffraction peak in the range of 2θ=18.7±1° in a powder X-ray diffraction pattern (i.e., XRD half width), C/D, and the ratio of the peak intensity attributed to a Li—F bond and appearing in the range of 684 to 680 eV to the F1s peak intensity appearing in the range of 689 to 680 eV in a spectrum according to XPS (i.e., the amount of LiF of the negative electrode) were measured by the above-described method. Tables 1 to 3 show the results of the measurement. LiF on the negative electrode can be generated when the moisture adsorbed to the negative electrode, or a pyrolysis product of polyvinylidene fluoride, which is a negative electrode binder, reacts with a lithium compound included in the nonaqueous electrolyte. The moisture adsorbed to the negative electrode and the generation of the pyrolysis product of polyvinylidene fluoride can be controlled by the drying conditions of the negative electrode during manufacture, the composition of the nonaqueous electrolyte, and the like.

Examples 2 to 9 and Comparative Examples 1 to 5

Nonaqueous electrolyte batteries were obtained in the same manner as described above except that the types of the positive electrode active material and the negative electrode active material, the average primary particle size A of the positive electrode active material, the pore median diameter a of the positive electrode active material-containing layer, the average primary particle size B of the negative electrode active material, the pore median diameter b of the negative electrode active material-containing layer, A/B, a/b, the XRD half width, C/D, the presence or absence of diethyl carbonate in the nonaqueous electrolyte, the content of difluorophosphate in the nonaqueous electrolyte, and the amount of LiF of the negative electrode were as shown in Tables 1 to 3 below.

In Table 1, "NCM811" represents $LiNi_{0.8}Co_{0.1}Mn_{0.1}O_2$, and "NCM111" represents $LiNi_{0.33}Co_{0.33}Mn_{0.33}O_2$. The nonaqueous electrolyte used in Example 7 is as follows. Propylene carbonate (PC) and ethyl methyl carbonate (EMC) were mixed at a volume ratio of 1:2 to prepare a mixed solvent. Lithium hexafluorophosphate ($LiPF_6$) was dissolved in the mixed solvent at a concentration of 1 mol/L. Lithium difluorophosphate ($LiPO_2F_2$) in an amount of 1000 ppm was added to the obtained solvent to prepare a nonaqueous electrolyte.

The nonaqueous electrolyte used in Example 8 is as follows. Propylene carbonate (PC) and diethyl carbonate (DEC) were mixed at a volume ratio of 1:2 to prepare a mixed solvent. Lithium hexafluorophosphate ($LiPF_6$) was dissolved in the mixed solvent at a concentration of 1 mol/L to prepare non-aqueous electrolytes.

Figure 6:
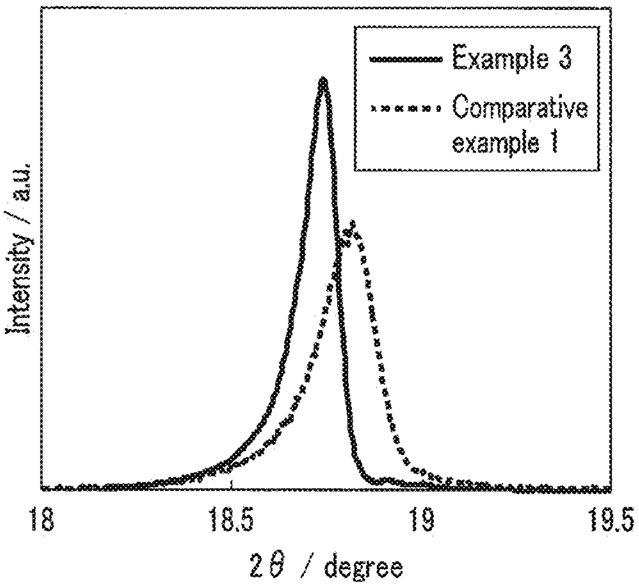
FIG. 6 is a diagram showing powder X-ray diffraction patterns of the positive electrodes of Example 3 and Comparative Example 1.

FIG. 6 shows the powder X-ray diffraction patterns, measured under the above-described conditions, of the positive electrode active materials of Example 3 and Comparative Example 1 in the range of 20 being 180 to 19.5°. In the positive electrode active material of Example 3, a peak appears at a 2θ of 18.7° in the XRD pattern. In the positive electrode active material of Comparative Example 1, a peak appears at a 2θ of 18.8° in the XRD pattern.

Figure 7:
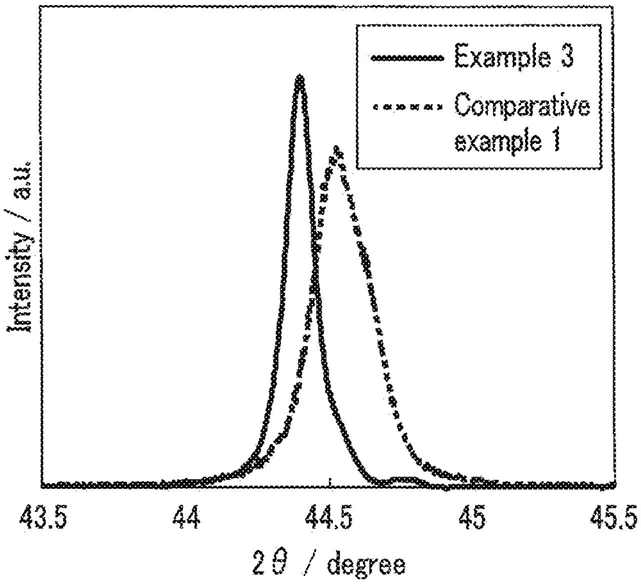
FIG. 7 is a diagram showing powder X-ray diffraction patterns of the positive electrodes of Example 3 and Comparative Example 1.

FIG. 7 shows the powder X-ray diffraction patterns, measured under the above-described conditions, of the positive electrode active materials of Example 3 and Comparative Example 1 in the range of 20 being 43.5° to 45.5°. In the positive electrode active material of Example 3, a peak appears at a 2θ of 44.4° in the XRD pattern. In the positive electrode active material of Comparative Example 1, a peak appears at a 2θ of 44.5° in the XRD pattern.

The cycle retention rates of the obtained secondary batteries were measured under the following conditions. Table 4 shows the results of the measurement. In the cycle test, 500 charge-and-discharge cycles were performed in a 45° C. environment. At this time, both charging and discharging were performed at a current value of 2 C. The discharge capacity at the first cycle and the discharge capacity at the 500th cycle were measured. A value obtained by dividing the obtained capacity at the 500th cycle by the capacity at the first cycle was defined as a cycle retention rate.

TABLE 1

| | Positive Electrode Active Material | Primary Particle Size A µm | Positive Electrode Pore Median Diameter a µm |
|---|---|---|---|
| Example 1 | NCM523 | 3.3 | 0.17 |
| Example 2 | NCM811 | 3.7 | 0.17 |
| Example 3 | NCM811 | 4.4 | 0.15 |
| Example 4 | NCM811 | 3.7 | 0.19 |
| Example 5 | NCM811 | 3.7 | 0.17 |
| Example 6 | NCM111 | 2.2 | 0.21 |
| Example 7 | NCM811 | 5.9 | 0.22 |
| Example 8 | NCM811 | 3.7 | 0.17 |
| Example 9 | NCM811 | 3.7 | 0.17 |
| Comparative Example 1 | NCM523 | 1.8 | 0.24 |
| Comparative Example 2 | NCM811 | 6.5 | 0.17 |
| Comparative Example 3 | NCM111 | 3 | 0.13 |
| Comparative Example 4 | NCM811 | 1.6 | 0.15 |
| Comparative Example 5 | NCM811 | 3.7 | 0.19 |

TABLE 2

| | Negative Electrode Active Material | Negative Electrode Primary Particle Size B µm | Negative Electrode Pore Median Diameter b µm | Drying Temperature of Negative Electrode Coating Liquid ° C. |
|---|---|---|---|---|
| Example 1 | LTO | 1 | 0.092 | 100 |
| Example 2 | LTO | 0.8 | 0.092 | 110 |
| Example 3 | LTO | 0.3 | 0.097 | 100 |
| Example 4 | LTO | 0.8 | 0.08 | 100 |
| Example 5 | LTO | 1 | 0.14 | 100 |
| Example 6 | LTO | 0.15 | 0.095 | 100 |
| Example 7 | LTO | 0.8 | 0.092 | 100 |
| Example 8 | LTO | 0.8 | 0.092 | 100 |
| Example 9 | LTO | 0.8 | 0.092 | 70 |
| Comparative Example 1 | LTO | 0.8 | 0.102 | 100 |
| Comparative Example 2 | LTO | 0.3 | 0.092 | 100 |
| Comparative Example 3 | LTO | 1.1 | 0.095 | 100 |
| Comparative Example 4 | LTO | 0.1 | 0.16 | 100 |
| Comparative Example 5 | LTO | 0.3 | 0.076 | 110 |

TABLE 3

| | A/B | a/b | XRD Half Width | C/D | Composition of Nonaqueous Electrolyte | | LiF Amount in Negative Electrode |
|---|---|---|---|---|---|---|---|
| | — | — | [°] | — | Diethyl carbonate | Difluorophosphate | % |
| Example 1 | 3 | 1.8 | 0.13 | 1.3 | Present | 5000 ppm | 16 |
| Example 2 | 5 | 1.8 | 0.13 | 5.0 | Present | 5000 ppm | 14 |
| Example 3 | 15 | 1.5 | 0.10 | 4.8 | Present | 30000 ppm | 10 |
| Example 4 | 5 | 2.4 | 0.10 | 7.0 | Present | 10000 ppm | 14 |
| Example 5 | 6 | 1.2 | 0.07 | 1.5 | Present | 5000 ppm | 16 |
| Example 6 | 15 | 2.2 | 0.14 | 1.4 | Present | 30000 ppm | 11 |
| Example 7 | 5 | 2.4 | 0.09 | 4.0 | Absent | 1000 ppm | 19 |
| Example 8 | 5 | 1.8 | 0.10 | 4.2 | Present | Absent | 17 |
| Example 9 | 5 | 1.8 | 0.12 | 5.0 | Present | 10000 ppm | 22 |
| Comparative Example 1 | 2 | 2.4 | 0.17 | 1.3 | Present | 10000 ppm | 14 |
| Comparative Example 2 | 22 | 1.8 | 0.05 | 1.4 | Present | 5000 ppm | 16 |
| Comparative Example 3 | 3 | 1.4 | 0.13 | 1.3 | Present | 5000 ppm | 16 |
| Comparative Example 4 | 16 | 0.9 | 0.11 | 1.4 | Present | 30000 ppm | 11 |
| Comparative Example 5 | 12 | 2.5 | 0.13 | 1.2 | Present | 10000 ppm | 10 |

TABLE 4

| | Cycle Retention Rate % |
|---|---|
| Example 1 | 96 |
| Example 2 | 98 |
| Example 3 | 98 |
| Example 4 | 98 |
| Example 5 | 95 |
| Example 6 | 94 |
| Example 7 | 91 |
| Example 8 | 90 |
| Example 9 | 90 |
| Comparative Example 1 | 86 |
| Comparative Example 2 | 88 |
| Comparative Example 3 | 84 |
| Comparative Example 4 | 83 |
| Comparative Example 5 | 79 |

As is clear from Tables 1 to 4, the batteries of Examples 1 to 9 have higher cycle retention ratios than the batteries of Comparative Examples 1 to 5.

A comparison of Examples 1 to 9 reveals that the batteries of Examples 1 to 6 have higher cycle retention ratios than those of Example 7, which does not include DEC, Example 8, which does not include difluorophosphate, and Example 9, which has an XPS peak intensity ratio higher than 20%. This result demonstrates that each of the nonaqueous electrolyte including diethyl carbonate and difluorophosphate and the negative electrode having an XPS peak intensity ratio of 20% or less contributes to the improvement of the life performance of the battery.

On the other hand, Comparative Examples 1 to 5 had a poor cycle retention ratio since Comparative Example 1 had an A/B of less than 3, Comparative Example 2 had an A/B of more than 15, Comparative Examples 3 and 4 had an a/b of less than 1.5, and Comparative Example 5 had an a/b of more than 2.4.

According to at least one embodiment and example described above, a battery is provided. The battery includes a positive electrode including a lithium nickel cobalt manganese composite oxide represented by $Li_xNi_{1-y-z}Co_yMn_zO_2$; $0<x\leq1.2$, $0<y<1$, $0<z<1$, and $0<y+z<1$ as a positive electrode active material and a negative electrode including a negative electrode active material which reacts at a potential higher than a Li reaction potential by 0.5 V or more. When the battery satisfies the following formulas (1) and (2), the over-discharge of the positive electrode is suppressed, allowing for improvement of the life performance.

$$3\leq A/B\leq15 \quad (1)$$

$$1.2\leq a/b\leq2.4 \quad (2)$$

where A denotes an average primary particle size of the positive electrode active material, B denotes an average primary particle size of the negative electrode active material, a denotes a pore median diameter of the positive electrode in a pore diameter distribution according to a mercury intrusion method, and b denotes a pore median diameter of the negative electrode in a pore diameter distribution according to a mercury intrusion method.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A nonaqueous electrolyte battery comprising:

a positive electrode comprising a lithium nickel cobalt manganese composite oxide represented by $Li_xNi_{1-y-z}Co_yMn_zO_2$; $0<x\leq1.2$, $0<y<1$, $0<z<1$, and $0<y+z<1$ as a positive electrode active material;

a negative electrode comprising a negative electrode active material which reacts at a potential higher than a Li reaction potential by 0.5 V or more; and a nonaqueous electrolyte, the nonaqueous electrolyte battery satisfying following formulas (1) and (2):

$$3\leq A/B\leq15 \quad (1)$$

$$1.2\leq a/b\leq2.4 \quad (2)$$

where A denotes an average primary particle size of the positive electrode active material, B denotes an average primary particle size of the negative electrode active material, a denotes a pore median diameter of the positive electrode in a pore diameter distribution according to a mercury intrusion method, and b denotes a pore median diameter of the negative electrode in a pore diameter distribution according to a mercury intrusion method, wherein the average primary particle size A of the positive electrode active material is 2 μm to 6 μm.

2. The nonaqueous electrolyte battery according to claim 1, wherein the average primary particle size B of the negative electrode active material is 0.15 μm to 1 μm.

3. The nonaqueous electrolyte battery according to claim 2, wherein the pore median diameter a of the positive electrode is 0.15 μm to 0.22 μm, and the pore median diameter b of the negative electrode is 0.08 μm to 0.15 μm.

4. The nonaqueous electrolyte battery according to claim 2, wherein in a powder X-ray diffraction pattern of the positive electrode with Cu K-α radiation, a half width of a diffraction peak in a range of $2\theta=18.7\pm1°$ is 0.06° to 0.14°, and a following formula (3) is satisfied:

$$1.3\leq C/D \quad \text{(formula 3)}$$

where C denotes an integrated intensity at a peak in a range of $2\theta=18.7\pm1°$ in the powder X-ray diffraction pattern, and D denotes an integrated intensity at a peak in a range of $2\theta=44.4\pm1°$ in the powder X-ray diffraction pattern.

5. The nonaqueous electrolyte battery according to claim 2, wherein the nonaqueous electrolyte comprises diethyl carbonate and difluorophosphate.

6. The nonaqueous electrolyte battery according to claim 1, wherein the pore median diameter a of the positive electrode is 0.15 μm to 0.22 μm, and the pore median diameter b of the negative electrode is 0.08 μm to 0.15 μm.

7. The nonaqueous electrolyte battery according to claim 6, wherein in a powder X-ray diffraction pattern of the positive electrode with Cu K-α radiation, a half width of a diffraction peak in a range of 2θ=18.7±1° is 0.06° to 0.14°, and a following formula (3) is satisfied:

$$1.3 \leq C/D \quad \text{(formula 3)}$$

where C denotes an integrated intensity at a peak in a range of 2θ=18.7±1° in the powder X-ray diffraction pattern, and D denotes an integrated intensity at a peak in a range of 2θ=44.4±1° in the powder X-ray diffraction pattern.

8. The nonaqueous electrolyte battery according to claim 6, wherein the nonaqueous electrolyte comprises diethyl carbonate and difluorophosphate.

9. The nonaqueous electrolyte battery according to claim 1, wherein the nonaqueous electrolyte comprises diethyl carbonate and difluorophosphate.

10. The nonaqueous electrolyte battery according to claim 1, wherein in a spectrum according to photoelectron spectrometry of a surface of the negative electrode, a ratio of a peak intensity attributed to a Li—F bond and appearing in a range of 684 to 680 eV to a F1s peak intensity appearing in a range of 689 to 680 eV is 20% or less.

11. A battery pack comprising the nonaqueous electrolyte battery according to claim 1.

12. A nonaqueous electrolyte battery comprising:

a positive electrode comprising a lithium nickel cobalt manganese composite oxide represented by $Li_xNi_{1-y-z}Co_yMn_zO_2$; 0<x≤1.2, 0<y<1, 0<z<1, and 0<y+z<1 as a positive electrode active material;

a negative electrode comprising a negative electrode active material which reacts at a potential higher than a Li reaction potential by 0.5 V or more; and a nonaqueous electrolyte, the nonaqueous electrolyte battery satisfying following formulas (1) and (2):

$$3 \leq A/B \leq 15 \quad (1)$$

$$1.2 \leq a/b \leq 2.4 \quad (2)$$

where A denotes an average primary particle size of the positive electrode active material, B denotes an average primary particle size of the negative electrode active material, a denotes a pore median diameter of the positive electrode in a pore diameter distribution according to a mercury intrusion method, and b denotes a pore median diameter of the negative electrode in a pore diameter distribution according to a mercury intrusion method, wherein in a powder X-ray diffraction pattern of the positive electrode with Cu K-α radiation, a half width of a diffraction peak in a range of 2θ=18.7±1° is 0.06° to 0.14°, and a following formula (3) is satisfied:

$$1.3 \leq C/D \quad \text{(formula 3)}$$

where C denotes an integrated intensity at a peak in a range of 2θ=18.7±1° in the powder X-ray diffraction pattern, and D denotes an integrated intensity at a peak in a range of 2θ=44.4±1° in the powder X-ray diffraction pattern.

* * * * *